United States Patent [19]
Watson et al.

[11] Patent Number: 4,819,707
[45] Date of Patent: Apr. 11, 1989

[54] SLIDE LATCH SYSTEM FOR RETRACTABLE AWNING

[75] Inventors: Carl C. Watson, Broomfield; Antony W. Quinn, Westminster, both of Colo.

[73] Assignee: Carefree/Scott Fetzer Company, Broomfield, Colo.

[21] Appl. No.: 48,413

[22] Filed: May 11, 1987

[51] Int. Cl.⁴ .............................................. E04F 10/06
[52] U.S. Cl. ...................................... 160/67; 160/69; 160/305
[58] Field of Search ....................... 160/67, 66, 68, 69, 160/70, 71, 72, 73, 74, 75, 22, 78, 79, 80, 65, 300, 301, 302, 305; 135/89

[56] References Cited

U.S. PATENT DOCUMENTS

| | | | |
|---|---|---|---|
| 3,789,903 | 2/1974 | Clark et al. | 160/75 |
| 3,866,874 | 2/1975 | Upton, Jr. | |
| 3,918,510 | 11/1975 | Hayward | 160/68 X |
| 4,077,419 | 3/1978 | Lux | 160/66 X |
| 4,117,876 | 10/1978 | Bennett | 160/67 |
| 4,180,117 | 12/1979 | Greer | 160/72 X |
| 4,198,998 | 4/1980 | Duffy | 160/66 X |
| 4,269,531 | 5/1981 | Brolin | 160/22 X |
| 4,658,877 | 4/1987 | Quinn | 160/67 X |
| 4,719,954 | 1/1988 | Curtis et al. | |

Primary Examiner—Robert W. Gibson, Jr.
Assistant Examiner—David M. Purol
Attorney, Agent, or Firm—Gary M. Polumbus

[57] ABSTRACT

A slide latch mechanism for use in a retractable awning wherein a rafter arm has one end adapted to slide along a support arm includes a pocket at the upper end of the support arm into which the slide member can be received to temporarily retain the slide member at the upper end of a support arm. The slide member retained in this manner, prevents an inadvertent collapse of the awning.

6 Claims, 7 Drawing Sheets

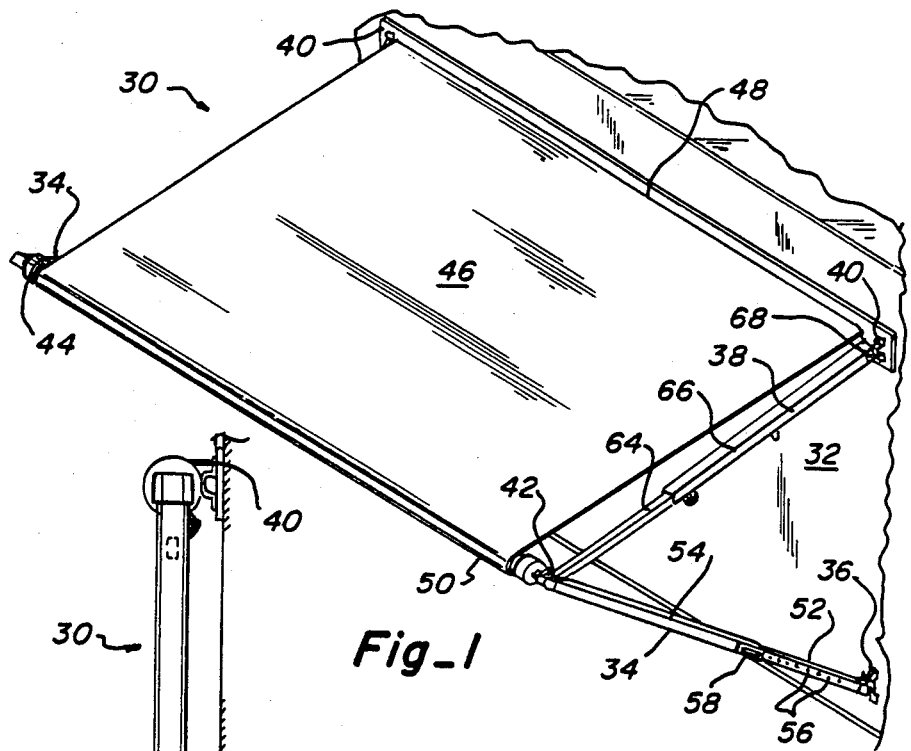
Fig_1
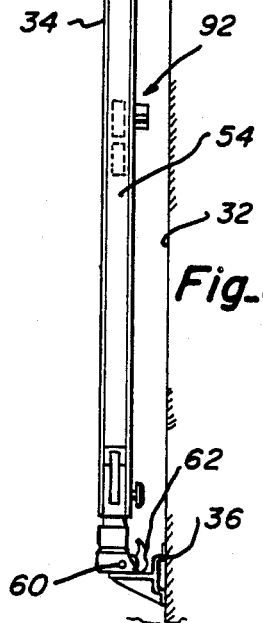
Fig_3
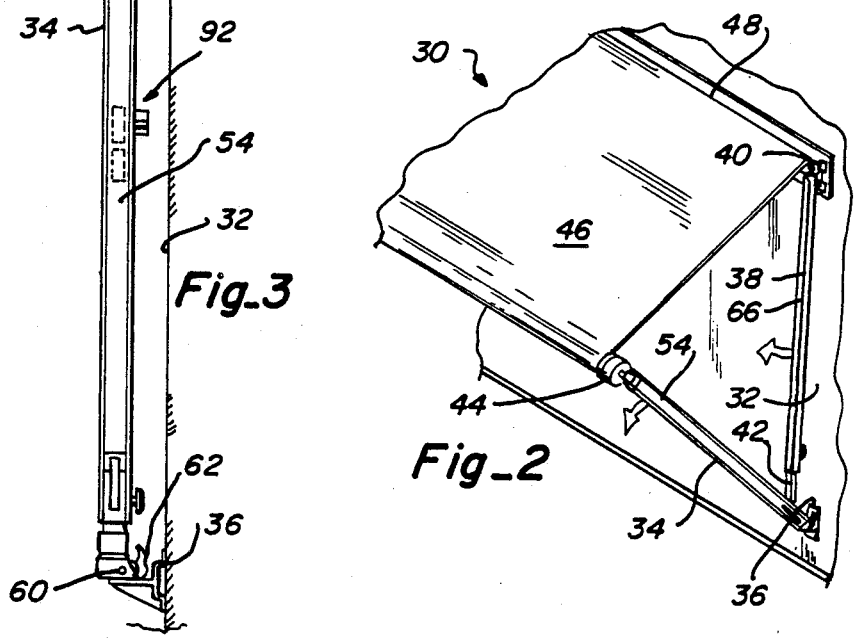
Fig_2

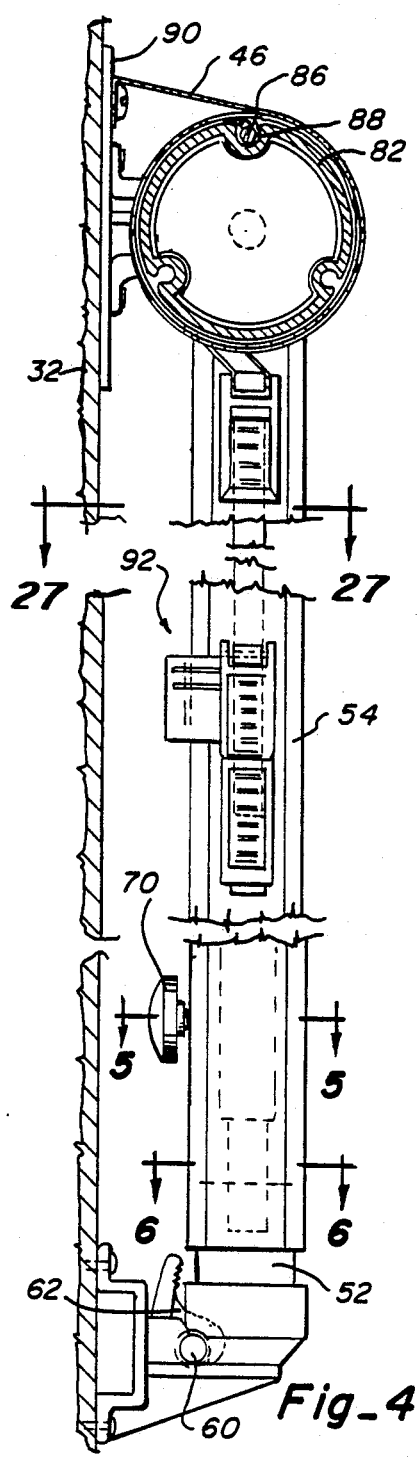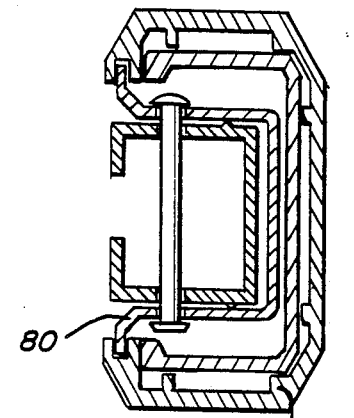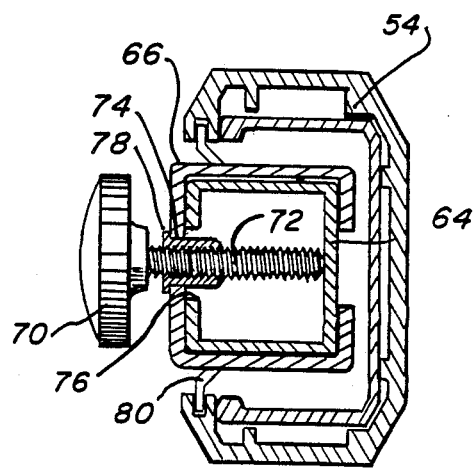

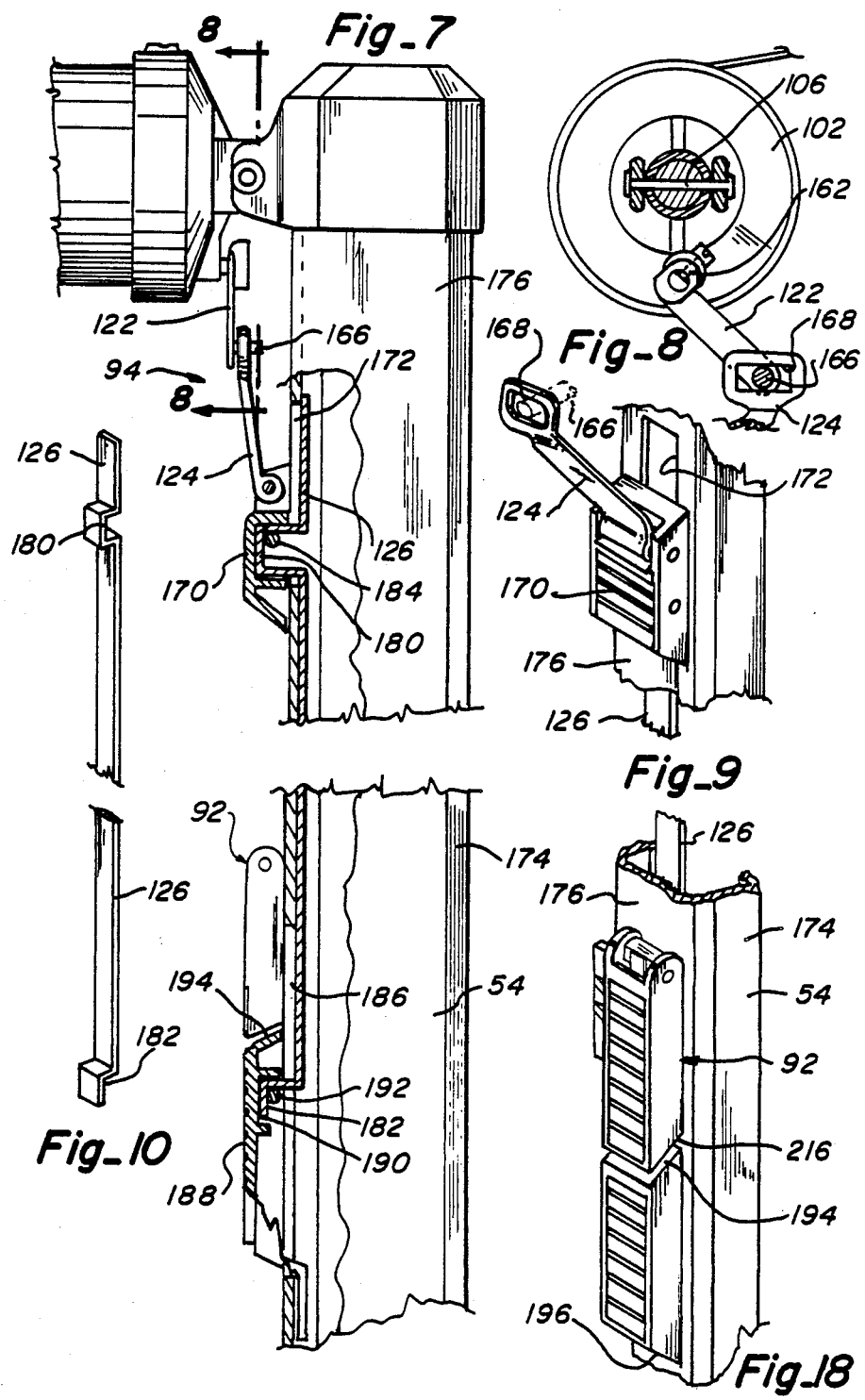

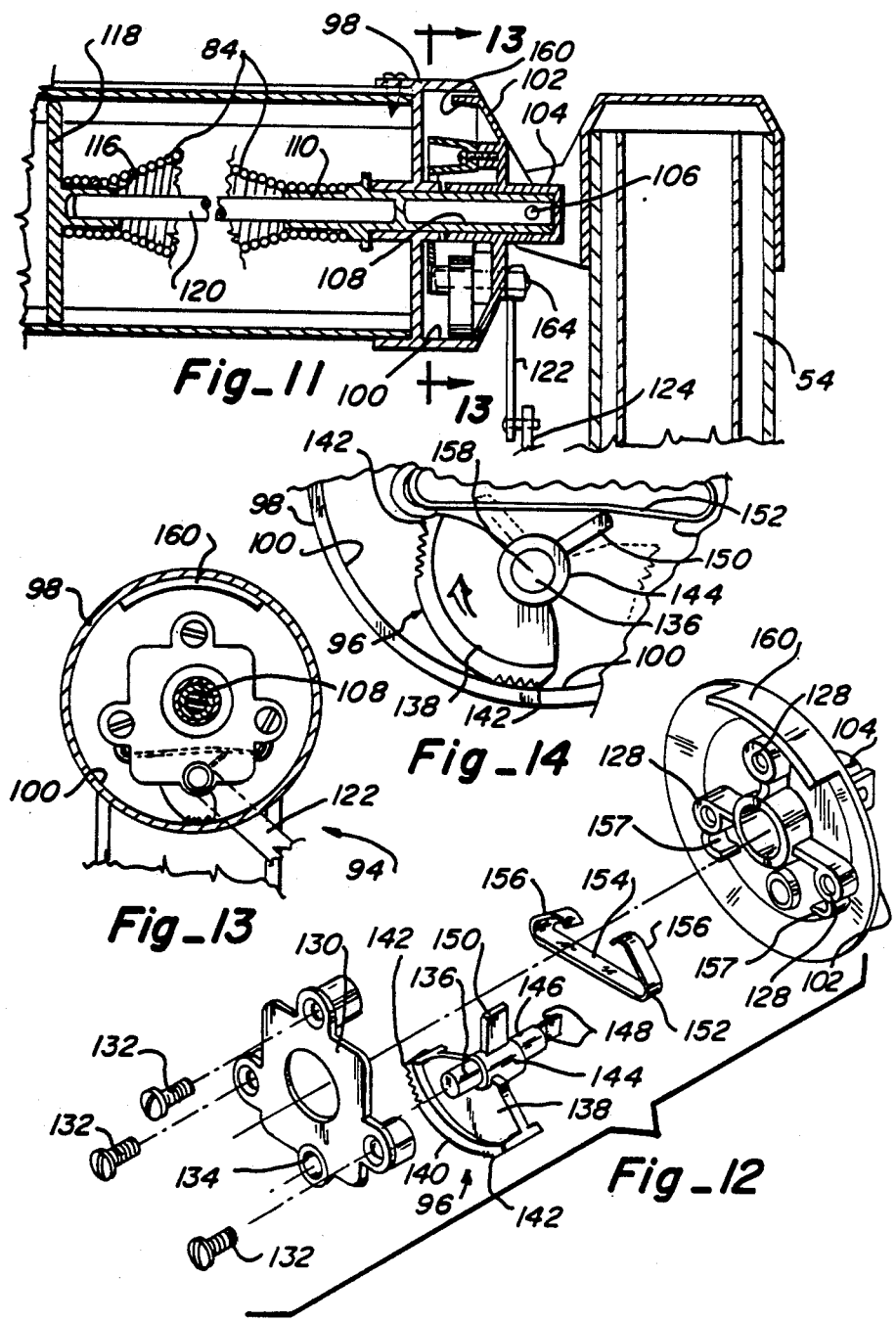

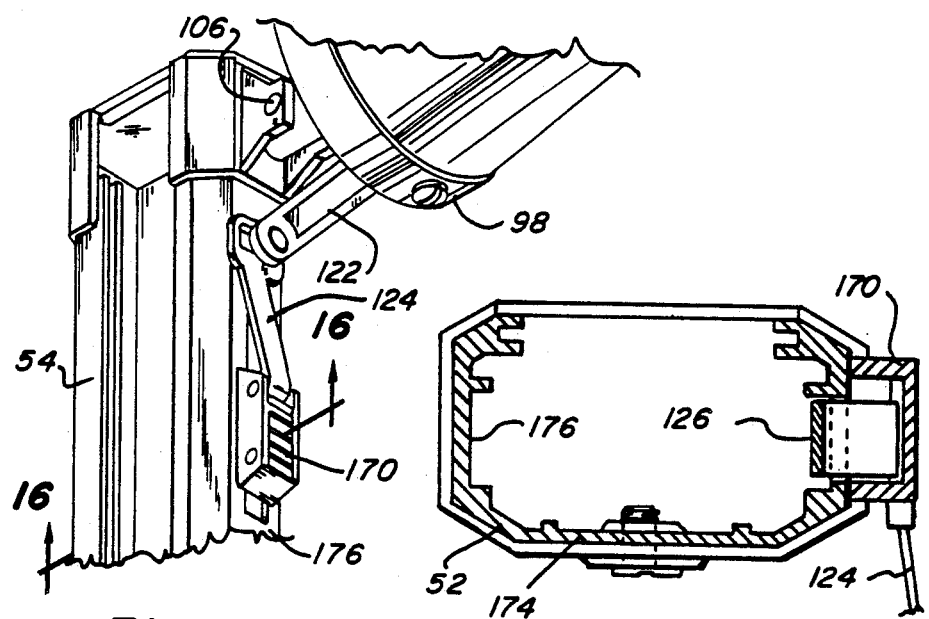
Fig_15    Fig_16
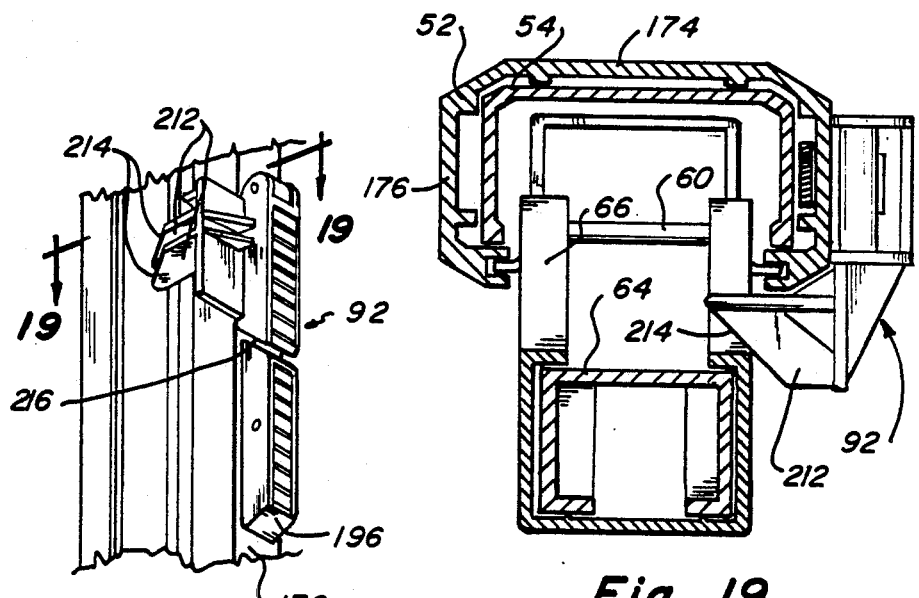
Fig_17    Fig_19

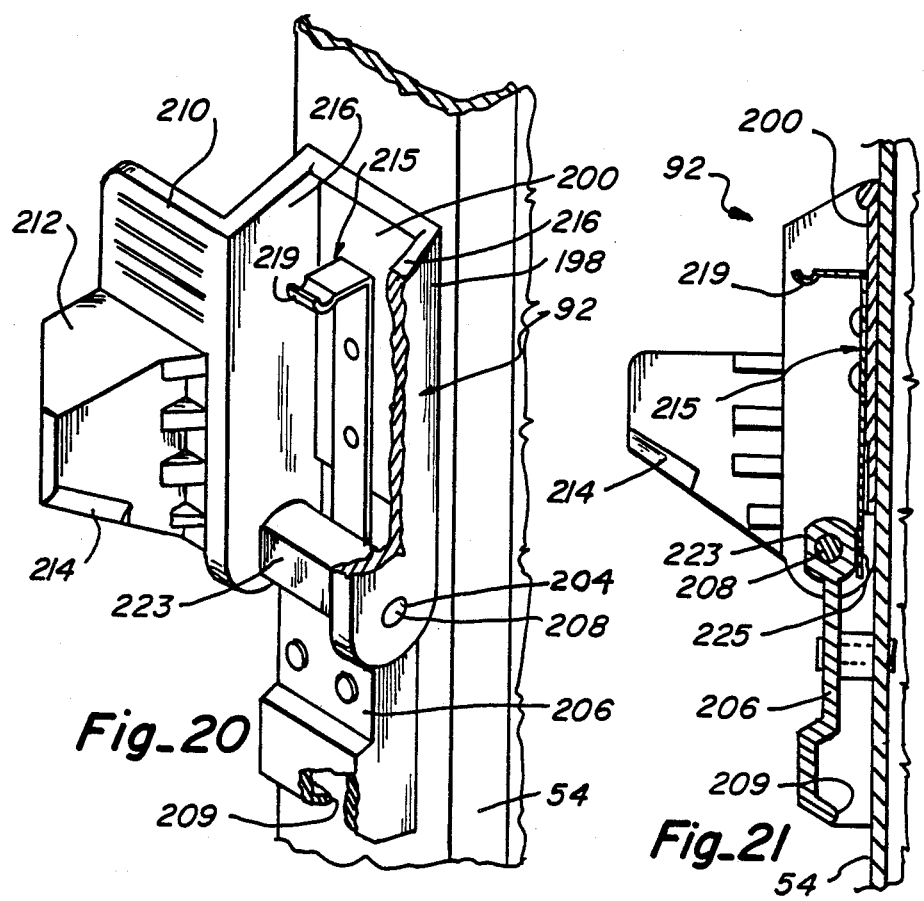
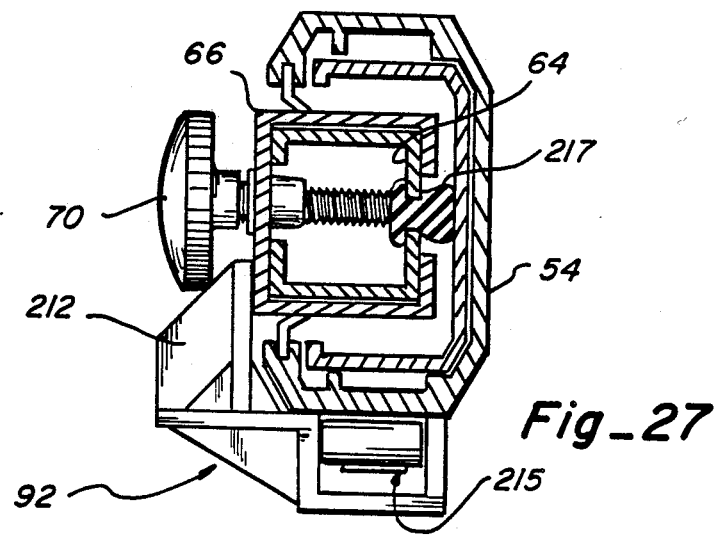

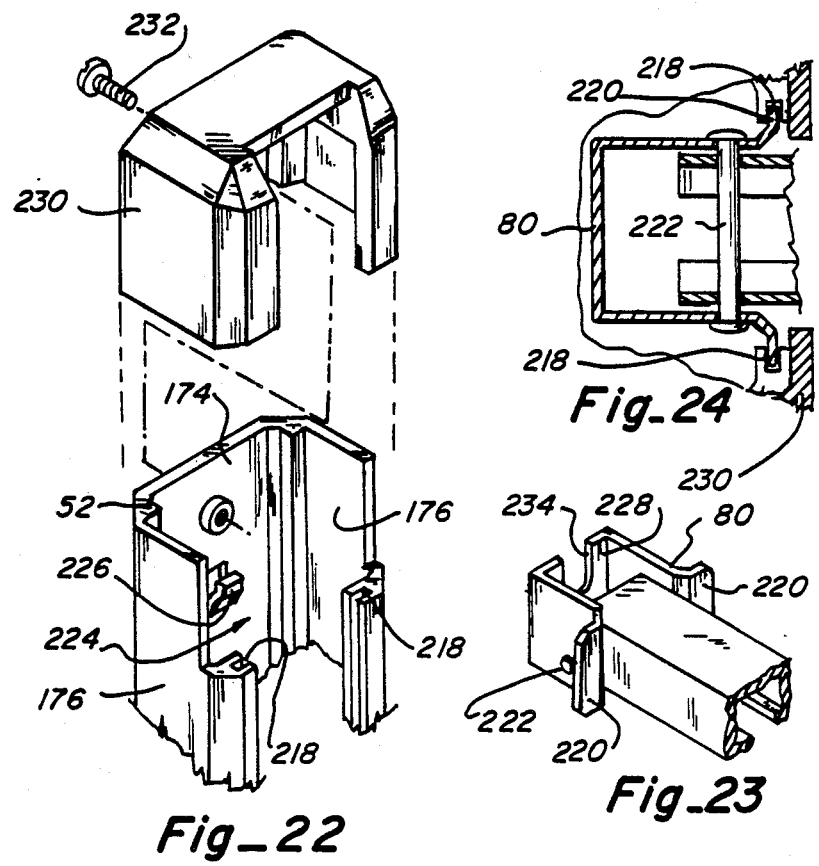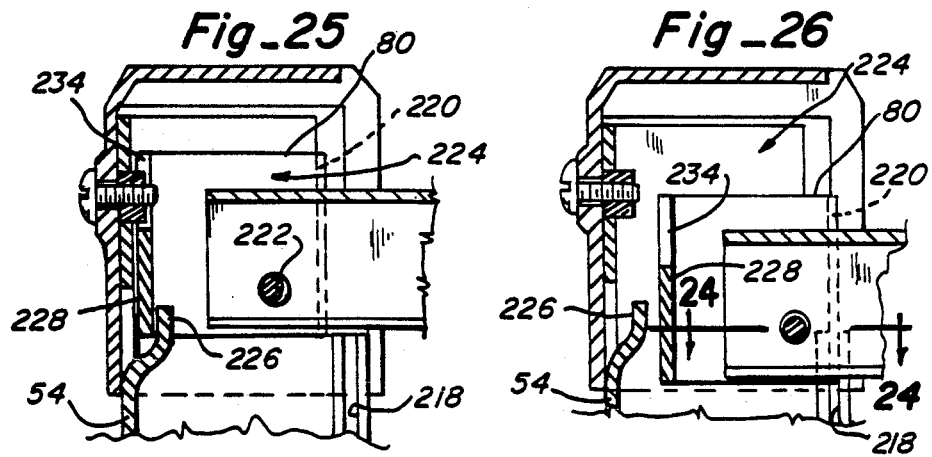

SLIDE LATCH SYSTEM FOR RETRACTABLE AWNING

BACKGROUND OF THE INVENTION

1. Field Of The Invention

The present invention relates generally to retractable awnings and more particularly to hardware for use in such an awning.

2. Description Of The Prior Art

Retractable awnings of the type adapted to be mounted on a substantially vertical fixed surface so as to be moveable between retracted and extended positions have been in use for some time. More recently, however, retractable awnings have been mounted on mobile vehicles, such as recreational vehicles, mobile homes and the like. Due to the fact that the more recent mobile retractable awnings are used by many members of the consuming public as opposed to being primarily for commercial use, the systems have been modified and refined so as to be easily manageable and operable while being aesthetically pleasing.

Most retractable awnings include a support arm which is secured at its upper end to a roll bar about which the canopy for the awning is rolled and releasably connected at its lower end to a bracket mounted on the substantially vertical support surface. A rafter or brace arm is normally provided so as to extend from an upper bracket also mounted on the support surface and is adapted to be connected to the support arm at its opposite end to brace the awning in its extended position. In many such awnings, the end of the rafter which is not connected to the substantially vertical surface is releasably connectable to the roll bar when the awning is extended and disconnected therefrom for storage against the substantially vertical surface when the awning is retracted. In other retractable awnings, however, the end of the rafter arm which is not connected to the substantially vertical surface is connected to a slide member which is adapted to reciprocally move in a groove provided in the support arm whereby the slide is positioned near the lower end of the support arm when the awning is in the retracted position but is positioned adjacent the roll bar when the awning is extended.

In retractable awnings of the type which utilize a slide, it is important to provide a system for temporarily or releasably retaining the slide at the roll bar end of the support arm to prevent an inadvertent movement of the awning from its extended position to its retracted position. Prior art devices utilized for this purpose are either difficult to operate, rendering them undesirable from a marketing standpoint, or expensive in manufacture, rendering them undesirable from a cost standpoint.

Accordingly, it is a primary object of the present invention to provide a new and improved system for retaining the slide member of a rafter arm at the upper end of the support arm adjacent to the roll bar when the awning is extended.

It is a more specific object of the present invention to provide a simple to operate system which is inexpensive to manufacture that efficiently retains the slide member of a rafter arm adjacent the upper end of the support arm when the awning is in an extended position.

SUMMARY OF THE INVENTION

The slide latch system of the present invention is adapted for use in a retractable awning of the type having a pair of support arms pivotally connected at a lower end to a supporting surface by a pair of lower bracket members and carrying between the upper ends thereof a roll bar about which a flexible canopy can be rolled. The awning assembly further includes a pair of rafter arms having an upper end connected to an upper bracket on the support surface and the lower ends connected to a slide member adapted to move reciprocally within a main longitudinal groove provided in an associated support arm.

As will be appreciated, it is desirable in such awning assemblies that the slide member be selectively retainable at the upper end of the support arm adjacent to the roll bar to retain the awning in its extended position and that this retention be accomplished in an inexpensive and simple to operate manner.

In the present invention, the slide member has a pair of oppositely directed flanges which ride in a pair of confronting grooves provided in the main groove of the support arm. At the upper end of the support arms, the confronting grooves are discontinuous, establishing a pocket in the main groove into which the slide member will drop when the slide member is moved beyond the confronting grooves. A latch finger is provided in the pocket to assist in retaining the slide member in the pocket until it is desired to move the awning to its retracted position, at which time the slide is easily removed from the latch finger and aligned with the confronting grooves so that it can again slide along the support arm permitting the awning to be retracted.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a fragmentary perspective view of a retractable awning incorporating the present invention with the awning being in an extended position.

FIG. 2 is a fragmentary perspective view similar to FIG. 1 with the awning being moved from its retracted to the extended position.

FIG. 3 is an enlarged side elevation of the awning shown in FIG. 1 with the awning being illustrated in a retracted position.

FIG. 4 is an enlarged fragmentary vertical section taken through the awning in its retracted position with parts removed for convenience of size.

FIG. 5 is an enlarged section taken along line 5—5 of FIG. 4.

FIG. 6 is an enlarged section taken along line 6—6 of FIG. 4.

FIG. 7 is a fragmentary side elevation of the support arm of the present invention connected to the roll bar with parts removed for clarity.

FIG. 8 is a section taken along line 8—8 of FIG. 7.

FIG. 9 is a fragmentary perspective view of a portion of the roll bar lock system utilized in the retractable awning.

FIG. 10 is a perspective view of a push-pull bar utilized in the roll bar lock system of the retractable awning with parts removed for convenience of size.

FIG. 11 is a fragmentary vertical section taken through the connection of a support arm to the roll bar of the retractable awning.

FIG. 12 is an exploded fragmentary perspective view showing component parts of the roll bar lock system for the retractable awning.

FIG. 13 is a section taken along line 13—13 of FIG. 11.

FIG. 14 is an enlarged fragmentary section illustrating a part of the roll bar as shown in FIG. 13 illustrating the operation of part of the lock mechanism for the roll bar of the retractable awning.

FIG. 15 is a fragmentary perspective view of the connection of the support arm to the roll bar and particularly illustrating a part of the lock mechanism for the roll bar of the retractable awning.

FIG. 16 is an enlarged section taken along line 16—16 of FIG. 15.

FIG. 17 is a fragmentary perspective view of a portion of the support arm utilized in the retractable awning illustrating the cooperation of a travel lock with one of the operating levers for the lock mechanism for the roll bar.

FIG. 18 is a fragmentary perspective view of a portion of the support arm of the retractable awning again illustrating the cooperation of the travel lock with an operating lever for the lock mechanism for the roll bar.

FIG. 19 is an enlarged section taken along line 19—19 of FIG. 17.

FIG. 20 is a fragmentary perspective view of a portion of the support arm showing the travel lock in an unlocked condition with parts broken for clarity.

FIG. 21 is a fragmentary vertical section taken through a portion of the support arm and the travel lock illustrating the travel lock in its unlocked condition.

FIG. 22 is a fragmentary exploded perspective view of the upper end of a support arm of the retractable awning illustrating the pocket in the support arm for releasably retaining the slide of a rafter arm.

FIG. 23 is a fragmentary perspective view of the slide member connected to the end of a rafter arm.

FIG. 24 is an enlarged section taken along line 24—24 of FIG. 26.

FIG. 25 is an enlarged section taken through the end of a support arm illustrating the slide member in a retained position within the pocket at the end of the support arm.

FIG. 26 is a section taken through the end of a support arm similar to FIG. 25 with the slide member in a position wherein it is being removed from the pocket in the support arm.

FIG. 27 is a section taken along line 27—27 of FIG. 4.

DESCRIPTION OF THE PREFERRED EMBODIMENT

The present invention finds primary utility in a retractable awning 30 of the type adapted to be mounted on a vertical or substantially vertical support surface 32 and moveable from an extended position to a retracted position adjacent that surface. Such an awning is illustrated in FIGS. 1 through 3 and can be seen to include a pair of support arms 34 pivotally connected at a lower end to a pair of associated lower bracket members 36 mounted on the support surface 32, a pair of rafter arms 38 having their upper ends pivotally mounted on a pair of upper brackets 40 on the support surface with the lower ends 42 of the rafter arms being slideably connected to an associated support arm 34 in a manner to be described hereinafter, a roll bar 44 connected at opposite ends to the upper ends of the support arms, and a canopy 46 secured along an inner edge 48 to the support surface and having its outer edge 50 secured to the roll bar so as to be wrapped therearound when the awning is rolled into its retracted position.

As will become more clear hereinafter, the support arms 34 consist of inner and outer channel-shaped members 52 and 54 respectively which are telescopically related and longitudinally adjustable so as to be fixed in any desired longitudinally related position. The inner member 52 has a plurality of openings 56 provided along a side thereof and the outer member 54 has a handle 58 carrying a lock pin (not seen) which can be inserted into any desired opening 56 to releasably set the length of the support arm. This system is conventional and a more detailed description thereof is not felt to be necessary. The handle 58 and openings 56 are best shown in FIG. 1 and it can there be appreciated that the extension and retraction of the support arms are very easily accomplished.

The lower end of the inner member 52 is pivotally mounted on the associated lower bracket 36 also in a conventional manner with the lower bracket preferably being of a type similar to that described in U.S. Pat. No. 4,530,389 of Quinn et al. which is of common ownership with the subject application. While the brackets 36 would not have to be identical to that disclosed in the Quinn et al. patent, it is desirable that the lower end of the support arms 34 be releasable from the brackets so that they can be swung outwardly and placed on the ground. In this orientation, the support arms form a vertical support post as opposed to the inclined support relationship that the support arms have in the illustrations of FIGS. 1 and 2.

The lower ends of the inner support arm members 52 have a transverse pin 60 thereon and each lower bracket 36 has a releasable catch arm 62 to releasably hold the lower end of the associated support arm in the bracket when desired, such as when the awning is in the condition of FIGS. 1 or 2 and also when the awning is in its retracted position of FIG. 3. However, if it is desired to place the support arms in a vertical supporting relationship wherein the lower end of the support arms are resting on the ground, the catch arms 62 are merely moved to release the pins 60 in a manner clearly described in the Quinn et al. patent.

The rafter arms 38 also include inner and outer telescoping members 64 and 66 respectively, with the outer member 66 being of channel-shaped configuration and having its upper end pivotally connected to the associated upper bracket 40 as by a pivot pin 68 and with the inner member 64 which is of square tubular stock forming an extension from the lower end of the outer member. As seen in FIGS. 1 and 5, the longitudinal relationship of the inner and outer rafter members 64 and 66 respectively is adjustable as by an adjustable knob 70 provided on the outer member with the knob having a shaft 72 threadedly received in a nut 78 pressed into an opening 74 provided in the outer member and a longitudinal slot 76 provided in the inner member. The shaft 72 is long enough so that it can be threadedly advanced against the opposing side of the inner member 64 drawing the inner member against the outer member 66 to frictionally retain the two members in any selected longitudinal relationship. Of course, counterclockwise rotation of the knob will loosen the relationship of the members, permitting them to slide relative to each other. The lowermost end of the inner member 64, which may be referred to as the lower end of the rafter arm, has a slide member 80 pivotally mounted thereon, as is best illustrated in FIG. 23, with the slide member being slideably retained in an associated support arm 34 in a manner to be described in more detail later.

The roll bar 44 is preferably of the type described in the aforenoted patent to Quinn et al. and includes a long cylindrical body 82 about which the canopy 46 can be rolled and having a torsion spring 84 positioned therein as seen in FIG. 11 for biasing the roll bar into the retracted position of the awning due to the fact that rolling movement of the roll bar as the awning is extended causes a torsioning of the torsion spring, thereby conditioning the spring to rotate the roll bar in the opposite direction, thereby rendering movement of the awning from its extended position of FIG. 1 to the retracted position of FIG. 3 a simple procedure. The canopy 46 is secured to the roll bar in any conventional manner such as by a securement rod 86 provided in a channel 88 formed in the roll bar as seen in FIG. 4, and the opposite end 48 of the canopy is secured to the supporting surface 32 in any conventional manner such as by a horizontal anchor bar 90 screwed or otherwise fastened to the supporting surface.

Generally, the awning 30 is retained in its retracted position illustrated in FIG. 3 with the canopy entirely rolled upon the roll bar and the support arms and rafter arms positioned in a nested vertical relationship. The awning is retained in the retracted or stored position by a travel lock system 92 to be described hereinafter and by setting and fixing the length of the support arms with the lock handles 58 and the rafter arms with the adjustment knobs 70 so that they are inextensible thereby preventing movement of the awning to its extended position.

In order to extend the awning from the retracted to the extended position, the lock mechanism for the roll bar and adjustment knobs 70 are both released and the travel lock 92 unlocked so that the awning can be rolled outwardly by pivoting the support arms 34 from the vertical orientation of FIG. 3 to the angular orientation of FIGS. 1 and 2. FIG. 2 illustrates the awning in an intermediate position as it is being rolled outwardly and as will be appreciated, the rafter arms 38 which are in a vertical orientation in the retracted position of the awning are moved to a generally horizontal position by sliding the slide members 80 along the support arms until the slide members reach the upper ends of the support arms adjacent to the connections thereof to the roll bar 44. Once the roll bar is rolled out as far as desired, the support arms are locked at the desired extended length thereof by latching the lock handles 58 into one of the holes provided 56 in the inner support arm members 52 and the adjustment knobs 70 on the rafter arms are tightened to fix the length of the rafter arms. If desired, and as previously mentioned, the lower end of the support arms can be released from the lower brackets 36 so that the support arms can be pivoted into a vertical orientation (not shown) with the lower ends thereof supported on the ground.

To retract the awning, of course, the opposite procedure is followed whereby the length of the support and rafter arms are free to contract and the spring bias on the roller bar 44 encourages it to roll inwardly wrapping the canopy 46 therearound until the awning is positioned as illustrated in FIG. 3 whereupon the length of the support arms and rafter arms are fixed with the lock handles 58 and adjustment knobs 70 respectively and the travel lock 92 is again secured in its locked position.

To prevent the awning from being unrolled when it is in the stored or retracted position of FIG. 3 and to prevent the awning from retracting from its extended to its stored position, an eccentric-type roll bar lock mechanism 94 is employed to selectively permit rotation of the roll bar 44 in one direction while preventing rotation in the opposite direction and vice versa. The roll bar lock mechanism 94 is best illustrated in FIGS. 4 through 12 to comprise a lock element 96 that is mounted in the end of the roll bar and moveable between two distinct positions in which rotation of the roll bar is permitted in one direction while being prevented in the opposite.

Referring to FIG. 11, it will be seen that the roll bar 44 includes an extension member 98 at one end which has a generally cylindrical configuration defining an inner cylindrical surface 100 with an end cap 102 secured to the cylindrical extension 98 to substantially enclose the open end of the cylindrical extension. The end cap 102 has a cylindrical hub 104 formed thereon having a transverse passage to receive a pin 106 which secures the cap 102 to the cylindrical extension 98 and also secures the upper end of the support arm 34 to the roll bar 44 in a manner which will become more clear hereinafter. The pin 106 also extends through a shaft 108 that is journaled in the cylindrical extension and includes a second hub 110 on its inner end which projects into the end of the roll bar. The second hub 110 includes a plurality of grooves (not seen) on its external surface adapted to seat one end of the torsion spring 84 with the opposite end of the torsion spring being seated on similar grooves (not seen) provided on a third hub 116 established on a disc member 118 which is fixed to the internal surface of the roll bar 44 at a spaced location from the cylindrical extension 98. The third hub 116 rotatably supports one end of a shaft 120. The opposite end of the shaft 120 is rotatably seated in the second mentioned hub 110 which, as will be appreciated, does not rotate as the roll bar itself is rotated due to the fact that the second hub is part of the shaft 108 which protrudes through the cylindrical extension 98 and is affixed to the end cap 102 and ultimately the support arm 34. Accordingly, it will be appreciated that torsion spring 84 is tensioned tensioned as the roll bar is moved from the retracted to the extended position of the awning and further, the cylindrical extension 98 on the roll bar rotates upon movement of the roll bar relative to the end cap 102 on which the lock mechanism 94 to be described hereinafter is mounted.

The lock mechanism 94 includes the previously mentioned lock element 96, a lever arm 122 keyed to the lock element to move the lock element between first and second positions to be described later, an operating arm 124 connected to the lever arm, and an extension or push-pull bar 126 connected to the operating arm 124 so as to enable operation of the lock mechanism from a remote location approximately midway along the length of the associated support arm.

Referring to FIG. 12, it will be seen that the end cap 102, in addition to having a central hub 104 for receiving the shaft 108, has a plurality of bosses 128 having threaded holes therein so that a mounting plate 130 can be attached to the end cap by fasteners 132. The mounting plate 130 has a bearing 134 provided therein adapted to rotatably receive and support a pivot shaft 136 on the lock element 96. The lock element, as best seen in FIGS.

12 and 14, includes an arcuate disc segment 138 having a flange 140 along its periphery with the flange 140 having a plurality of raised radially protruding ribs or contact surfaces 142 at opposite ends thereof, a central hub 144 from which the pivot shaft 136 projects, and an extension key shaft 146 extending from the opposite side of the arcuate disc having flat opposed sides 148 so that the key shaft 146 can be keyed to the lever arm 122 as will be described later. The hub 144 on the lock element has a bias arm 150 projecting upwardly therefrom in the opposite direction from the arcuate disc 138. The biasing arm 150 is adapted to cooperate with a leaf spring 152 to bias the arcuate disc into either of its two positions.

The leaf spring 152 as seen in FIG. 12, is of generally U-shaped configuration having an elongated base segment 154 and a pair of upstanding legs 156 which are inwardly convergent whereby the leaf spring can be seated in a pair of grooves 157 formed in the inner face of the end cap 102 such that the base portion of the spring extends horizontally across the end cap immediately above the arcuate disc 138 whereby the bias arm 150 can be pivotally moved along the base 154 of the spring to urge the bias arm either to the right or to the left as viewed in FIG. 13, but preventing the bias arm from being retained in a vertical orientation. As will be appreciated, with reference to FIGS. 13 and 14, when the bias arm 150 is positioned either to the right or to the left, the raised ribs 142 at opposite ends of the flange 140 of the arcuate disc are placed in engagement with the cylindrical surface 100 on the inside of the cylindrical extension 98.

As is probably best appreciated by reference to FIG. 14, the raised ribs 142 on the flange 140 of the arcuate disc 138 are a greater distance from the pivotal axis 158 of the arcuate disc than the arcuate surface of the flange itself so that the arcuate disc is moveable between the two terminal positions shown in FIG. 14, with one position being shown in solid line and the other position being shown in phantom line. It can be seen that in the solid line position, the raised ribs 142 on the right edge of the flange are in engagement with the inner cylindrical surface 100 of the cylindrical extension 98 and due to the fact that the arcuate surface of the flange itself is not as far from the pivot axis 158 as are the raised ribs, the arcuate disc can be pivoted to the phantom line position without the flange 140 engaging the inner cylindrical surface. Once the arcuate disc 138 is shifted to the phantom line position, the raised ribs 148 at the left edge of the arcuate disc will engage the inner cylindrical surface 100. As will be appreciated, when the lock element 96 and particularly the arcuate disc 138 is in the solid line position of FIG. 14, the cylindrical extension 98 and thus the roll bar 44 itself is prevented from being rotated in a clockwise direction but is free to rotate in a counterclockwise direction as the extension 98 when rotating in the counterclockwise direction can slide relative to the raised ribs 142, but movement of the cylindrical extension in the clockwise direction will be prevented due to the fact that the distance from the axis of rotation 158 to the ribs 142 is greater than the distance from the axis of rotation to the inner cylindrical surface 100 thereby establishing a lock in one direction. The same is true in the opposite directions when the arcuate disc is pivoted to the phantom line position wherein the rib at the left edge of the arcuate disc are in engagement with the inner cylindrical surface. In this position, the roll bar 44 is free to rotate in the clockwise direction but is prevented from rotation in the counterclockwise direction for the same reasons as previously described in connection with the solid line position of the arcuate disc.

As can be appreciated, in order to accommodate the above operative relationship between the arcuate disc and the cylindrical surface 100, it is necessary that the ribs 142 be spaced from the axis of rotation 158 a greater distance than the distance from the axis of rotation 158 to a point on the cylindrical surface which lies on a radius of the cylindrical surface passing through the axis of rotation 158.

The end cap 102 has an arcuate flange 160 provided along the upper periphery thereof. The arcuate flange 160 projects into the cylindrical extension 98 so as to be disposed immediately adjacent to the cylindrical surface 100. The arcuate flange acts as a reactionary plate so that when the ribs 142 on the flange 140 of the arcuate disc 138 are in engagement with the cylindrical surface 100, the arcuate flange 160 will retain the end cap 102 in axial alignment with the cylindrical extension 98 and thereby avoid placing the shaft 108 in a strain which might otherwise damage the system.

The arcuate disc 138 is shifted between the solid line and phantom line positions of FIG. 14 by the lever arm 122 which is an elongated arm having a rectangular slot 162 formed in one end to receive in a keyed relationship the extension key shaft 146 of the lock element 96. The end of the extension shaft is preferably provided with a threaded hole so that a screw-type fastener 164 can be threaded thereinto to hold the lever arm on the end of the extension key shaft. The arcuate disc 138 rotates as the lever arm 122 is rotated due to the fact that the extension shaft of the lock element is keyed to the lever arm.

As will be appreciated, the lock element 96 is disposed along the bottom of the cylindrical extension 98 and as best seen in FIG. 8, the lever arm 122 forms an angular extension therefrom so as to protrude at approximately a 45° angle away from vertical (when the awning is retracted) and downwardly to cooperate with the operating arm 124. The lower end of the lever arm 122 has a horizontal pin 166 affixed thereto which projects through a rectangular slot 168 provided in the upper end of the operating arm. The operating arm is pivotally attached to an upper finger slide 170 which is slideably mounted in a slot 172 formed in one side of the associated support arm 34.

Before further describing the remote operation of the roll bar lock mechanism 94, it is felt advisable to better describe the configuration of the associated support arm 34 itself which, as mentioned previously, is composed of inner and outer telescoping members 52 and 54 respectively. The outer telescoping member 54 as probably best seen in FIGS. 16 and 19, is of generally U-shaped configuration having a bottom plate portion 174 and a pair of upstanding side plate portions 176 which define a space therebetween to accommodate the inner support arm member 52 as well as the slide member 80 and the two component parts of the rafter arms 38 as will be described later.

The upper finger slide 170 of the roll bar lock mechanism 94 is mounted for sliding movement in one of the upstanding sides 176 of the outer support arm member 54 for sliding movement longitudinally of the support arm. As may be best seen in FIG. 15, the operating arm 124 angles slightly to one side as well as extending upwardly from the upper finger slide 170 whereby vertical sliding movement of the upper finger slide will cause the operating arm to also move vertically and further cause the lever arm 122 to pivot thereby moving the lock element 96 between the solid and phantom line positions of FIG. 14. The loose connections between the operating arm 124 and the lever arm 122 as well as the lever arm and the extension shaft 146 are provided to effect the desired movement of the related operating components.

As best seen in FIG. 7, the upper finger slide 170 has a rectangular pocket 178 formed on a rear surface so that the upper finger slide can be operatively connected to the push-pull bar 122 as best illustrated in FIG. 10. The push-pull bar is an elongated plate-like rigid member having a rectangular deformation 180 formed near its upper end and a generally inverted L-shaped deformation 182 at its lower edge with the rectangular deformation 180 adapted to fit within and be seated in the rectangular pocket 178 on the upper finger slide. A pin 184 passes horizontally through the upper finger slide to retain the push-pull bar in the upper finger slide in a conventional manner. The push-pull bar passes downwardly along an inner surface of the outer support arm member 54 with the lower end of the push-pull bar terminating at approximately midway along the length of the outer support arm member whereat another slot 186 is provided in the associated upstanding side of the support arm member. A lower finger slide 188 is slideably mounted in the slot 186 again in a conventional manner so that the lower finger slide can also move longitudinally of the support arm. The rear side of the lower finger slide 188 is also recessed to provide a space 190 into which the inverted L-shaped deformation 182 can extend and be retained therein by a horizontal pin 192 similarly to the connection of the push-pull bar to the upper finger slide. With this arrangement, it will be appreciated that sliding movement of the lower finger slide 188 along the length of the support arm will cause the upper finger slide 170 to move accordingly and consequently will cause the operating arm 124 and the lever arm 122 to move the arcuate disc 138 between the solid line and phantom line positions of FIG. 14.

As probably best seen in FIGS. 17 and 18, the lower finger slide 188 has upper and lower beveled surfaces 194 and 196 respectively which are outwardly convergent. The upper beveled surface 194 is adapted to cooperate with the travel lock 92 in a manner to be described later in connection with the operation of the travel lock. Suffice it to say, however, that the travel lock is adapted to retain the lower finger slide 188 at the lowermost extent of its sliding movement so as to prevent operation of the roll bar lock mechanism 94.

The travel lock 92 is adapted to help prevent the awning from movement between the retracted and extended positions and does so by preventing a release of the nested relationship between the rafter arms 38 and the support arms 34 and also by blocking a release of the roll bar lock mechanism 94 as mentioned hereinbefore.

The travel lock is best seen in FIGS. 4, 17, 20 and 21 to include a rigid intergral body 198 which is pivotally mounted on the upstanding side 176 of the outer support arm member 54 in close relationship with the lower finger slide 188 of the roll bar lock mechanism to cooperate therewith in retaining the awning in its retracted position. The body 198 includes a main portion 200 mounted on the side of the support arm in longitudinal alignment with the lower finger slide 188 and positioned immediately thereabove. The main portion 200 is generally U-shaped in transverse cross-section, as seen in FIG. 20, having a pair of openings 204 provided through the sides thereof adjacent one end. The main portion 200 is pivotally connected to the support arm by a hinge member 206 having a fixed pivot shaft 208 at one end disposed thereon with the ends of the pivot shaft being pivotally received in the openings 204. The opposite end of the hinge member has a notch 209 formed therein for a purpose to be described later.

A side plate 210 projects laterally away from the main portion 200 and has a pair of perpendicularly oriented locking plates 212 formed thereon. When the travel lock is in its locking position, illustrated in FIG. 17, the locking plates 212 extend over a portion of the groove in the outer main support arm member 54 and thereby are positioned to retain the rafter arms 38 within the groove as seen in FIG. 19. Each of the locking plates 212 has a cam or beveled edge 214 along the outer edge of the plate overlying the groove so that if the travel lock were in the locking position illustrated in FIG. 17 as the rafter arms were being moved into the groove, the rafter arms would hit the beveled edges 214 which would function as a cam in encouraging the travel lock body 198 to pivot about the pivot pin 208, thereby moving the locking plates 212 out of the path of movement of the rafter arms and avoiding damage to the travel lock. In other words, it is desirable to have the travel lock in the unlocked position of FIG. 20 before folding the awning or before moving the awning into its retracted position, but should the travel lock be in the locked position, it would not be damaged by the rafter arms as they are moved into the groove of the outer support arm member due to the fact that the travel lock would be cammed out of the line of movement of the rafter arms.

When the travel lock is in the locked position and the rafter arm is retained in the groove of the associated support arm, the travel lock is frictionally retained in position by a spring catch 215 and by engagement with the rafter arm which is yieldingly biased against the travel lock by a rubber stop 217. The rubber stop, as seen in FIG. 27, is fixedly mounted in a hole in the inner rafter arm member with the rubber stop being adapted to engage the inner support arm member when the rafter arm is fully nested in the support arm.

The end of the main portion 200 on the travel lock which is adjacent to the lower finger slide 188 of the roll bar lock mechanism is beveled at 216 to cooperate with the beveled upper surface 194 on the lower finger slide. In this manner, it will be appreciated that the lower finger slide is prevented from being moved upwardly and, therefore, is prevented from moving the arcuate disc 138 from one position to the other. When the lower finger slide is in its lower position, illustrated in FIG. 17, the arcuate disc is in a position to prevent unrolling of the awning or movement thereof from the retracted position to the extended position.

It will, therefore, be appreciated that the travel lock 92 not only serves to retain the rafter arms 38 within the support arms 34 but does so in a manner such that the travel lock cannot be damaged by an inadvertent movement of the rafter arms into the support arm when the travel lock is in the locking position and further, the travel lock prevents operation of the roll bar lock mechanism 94 so as to lock the roll bar 44 in the retracted position.

The spring catch 215 is a leaf spring mounted in flat engagement with the main portion 200 within the groove thereof. One end of the leaf spring projects away from the remainder thereof forming a catch 219 adapted to releasably project into the notch 209 of the hinge member to releasably retain the travel lock in its locked position. The opposite end 221 of the leaf spring projects over the fixed pivot shaft 208 which has flattened surfaces 223 and 225 on the top and bottom thereof. The end 221 of the leaf spring cooperates with the flat surface 223 on the top of the pivot shaft to assist the catch 219 in releasably retaining the main portion 200 in its locked position and cooperates with the flat portion 225 on the bottom of the pivot shaft to releasably retain the main portion 200 in its unlocked position.

As will be appreciated, when the awning is in the fully-extended position, the lower end of the rafter arms 38 which have the slide members 80 mounted thereon are disposed at the upper end of the support arms 34 near the connection of the support arms to the roll bar 44. It is desirable that a releasable system be provided for retaining the slide members at the upper end of the support arms but with the retention system being easily overcome so that the awning can be easily retracted from the extended to the retracted position.

With reference to FIGS. 22 through 26, it can be appreciated that in the preferred embodiment of the invention, the outer member 54 of each support arm 34 includes a pair of confronting grooves 218 and the slide member 80 is of generally U-shaped configuration, having a pair of outturned flanges 220 at its upper edge. The flanges are designed to slide in the confronting grooves 218 provided in the support arms. Each slide member 80 is pivotally mounted on the end of a rafter arm 38 by a pivot pin 222 so as to permit free sliding movement of the slide member along the support arm as the awning is moved between the extended and retracted positions.

In order to temporarily retain a slide member at the upper end of the associated support arm 34, the confronting grooves 218 are terminated a short distance before the upper end of the support arm so as to define a pocket 224 at the end of the support arm into which the slide member can drop. The bottom plate portion 174 of the support arm within the pocket 224 is deformed to define a latch finger 226 under which the base 228 of the slide member can fit so that, as illustrated in FIG. 25, when the slide member is passed beyond the confronting grooves 218 and allowed to drop into the pocket 224, the latch finger 226 will pass over the base 228 of the slide member to temporarily secure the slide member within the pocket and prevent the slide member from traveling longitudinally of the support arm.

The end of the support arm has a cap 230 secured thereto by a screw-type fastener 232 which projects into the pocket 224 a slight distance. In order to accommodate this fastener 232, the base 228 of the slide member is notched so that the fastener does not prevent the slide member 80 from being retained in the pocket by the latch finger 226.

In order to remove the slide member 80 from the pocket 224, the rafter arm 38 is merely lifted slightly so that the slide member is removed from its confinement under the latch finger 226 and in this position, the flanges 220 are easily aligned with the confronting grooves 218 to again place the slide member in the confronting grooves so that the awning can be moved from the extended to the retracted position.

Accordingly, the slide latch system hereindefined wherein the slide member 80 can be temporarily retained in a pocket 224 formed at the upper end of a support arm is merely one more system for retaining and holding the awning in its extended position. The other systems, including the roll bar lock mechanism 94, which in one position will prevent the roll bar from rolling in the direction necessary to retract the awning, the lock handle 58 on the support arm for fixing the length of the support arm, and the adjustment knob 70 on the rafters for fixing the length of the rafters. With each of these systems, as backups to each other, the awning can be very securely retained in the extended position illustrated in FIG. 1.

Movement of the awning 30 from the extended to the retracted position is very simple in that the roll bar lock mechanism 94 can be released easily by movement of the lower finger slide 188, the slide member 80 can be easily removed from the retaining pocket 224 at the end of the support arm by lifting the slide member and placing it back into the confronting grooves 218, and the lock handle 58 and adjustment knobs 70 released to allow the length of the support arm and rafter arms, respectively, to be shortened. In this condition, the awning is easily moved from its extended to its retracted position. Once the awning has assumed the position shown in FIG. 3, the roll bar lock mechanism 94 can be operated by lowering the lower finger slide 188 to move the arcuate disc 138 into the position which prevents an unrolling of the awning. The travel lock 92 can then be rotated into the locking position of FIG. 17 so that the rafter arms are retained within the associated support arm and the lower finger slide 188 is locked in its lower position. The lock handles 58 and adjustment knobs 70 can subsequently be appropriately operated to secure and fix the shortened length of the support arms and rafter arms respectively.

Although the present invention has been described with a certain degree of particularity, it is understood that the present disclosure has been made by way of example, and changes in detail or structure may be made without departing from the spirit of the invention, as defined in the appended claims.

We claim:

1. In a retractable awning mounted on a substantially vertical surface for movement between an extended and a retracted position, said awning having a roll bar about which a canopy can be rolled, a pair of channel-shaped support arms having a longitudinal groove formed therein and with one end of the support arms operatively connected to an associated end of the roll bar and another end for contacting a supporting surface, and a pair of rafter arms having one end operatively secured to said substantially vertical surface and the other end operatively securable to an associated one of said support arms by a slide member attached to said rafter arm, said support arms each having confronting grooves extending longitudinally thereof and said slide member including a pair of flanges slideably received in the confronting grooves so as to be said longitudinal groove of the associated support arm, wherein the improvement comprises:

a latch system means on said support arms for releasably retaining the slide member of the associated rafter arm at a preselected location on said support arm to retain the awning in the extended condition, said slide member being confined within said groove for sliding movement therein and the latch system means includes a pocket and a retaining means for cooperating with the slide member in releasably retaining the slide member in the pocket, said pocket being disposed in the associated support arm at a distal end thereof, said pocket is defined by a discontinuance of said confronting grooves whereby when the slide member is positioned in said pocket the flanges are removed from the confronting grooves to assist in releasably retaining the slide member in the pocket.

2. In the retractable awning of claim 1 wherein said retaining means system further includes a latch finger formed in the pocket.

3. In the retractable awning of claim 2 wherein said latch finger is formed by deforming the support arm at a location within said pocket.

4. In the retractable awning of claim 3 wherein said slide member has a plate portion adapted to cooperate with the latch finger in releasably retaining the slide member in the pocket.

5. In a retractable awning mounted on a substantially vertical surface for movement between an extended and a retracted position, said awning having a roll bar about which a canopy can be rolled, a pair of channel shaped support arms having a longitudinal main groove formed therein with confronting grooves extending along opposite sides of the main groove, one end of the support arms being operatively connected to an associated end of the roll bar and another end for contacting a supporting surface, and a pair of rafter arms having one end operatively secured to said substantially vertical surface and the other end operatively securable to an associated one of said support arms by a slide member attached to said rafter arm and slidably retained in the groove of the associated support arm, wherein the improvement comprises:

a latch system means on said one end of the support arms for releasably retaining an associated slide member at said one end of the support arms to retain the awning in the extended condition, said slide member being substantially U-shaped in transverse cross-section so as to define a bottom plate portion, two upstanding side plate portions and a pair of flanges projecting away from the side plate portions and adapted to be received in and slide along said confronting grooves, said latch system means includes a pocket and a retaining means for cooperating with the slide member in releasably retaining the slide member in the pocket, said pocket being disposed at said one end of each support arm, said pocket being a space defined within the main groove of said support arm, said space being devoid of said confronting grooves whereby movement of the slide member into said pocket will cause the flanges on the slide member to slide out of the confronting grooves and cooperate with the retaining means in retaining the slide member in the pocket.

6. In the retractable awning of claim 5 wherein the retaining means includes a latch finger on said support arm in said pocket adapted to selectively overlie the bottom plate portion of the slide member.

* * * * *